(12) United States Patent
Leone

(10) Patent No.: US 7,389,751 B2
(45) Date of Patent: *Jun. 24, 2008

(54) CONTROL FOR KNOCK SUPPRESSION FLUID SEPARATOR IN A MOTOR VEHICLE

(75) Inventor: Thomas G. Leone, Ypsilanti, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 11/384,111

(22) Filed: Mar. 17, 2006

(65) Prior Publication Data

US 2007/0215069 A1 Sep. 20, 2007

(51) Int. Cl.
*F02B 43/00* (2006.01)
*F02M 7/00* (2006.01)

(52) U.S. Cl. ........................... 123/1 A; 123/436

(58) Field of Classification Search ............ 123/3, 123/1 A, 575; 701/123
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarcbier | |
| 4,256,075 A | 3/1981 | Fukui et al. | |
| 4,311,118 A | 1/1982 | Slagle | |
| 4,325,329 A | 4/1982 | Taylor | |
| 4,331,121 A | 5/1982 | Stokes | |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,495,930 A * | 1/1985 | Nakajima | 123/575 |
| 4,502,453 A | 3/1985 | Kabasin et al. | |
| 4,590,904 A | 5/1986 | Wannenwetsch | |
| 4,648,367 A | 3/1987 | Gillbrand et al. | |
| 4,706,630 A | 11/1987 | Wineland et al. | |
| 4,810,929 A | 3/1989 | Strumbos | |

(Continued)

FOREIGN PATENT DOCUMENTS

| | | |
|---|---|---|
| EP | 1057988 | 1/2006 |
| JP | 61065066 | 9/1984 |
| JP | 2007/056754 | 8/2005 |
| WO | WO 2004/097198 | 11/2004 |
| WO | WO 2006/055540 | 5/2006 |
| WO | WO 2007/106354 | 9/2007 |
| WO | WO 2007/106416 | 9/2007 |

OTHER PUBLICATIONS

D.R. Cohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.

(Continued)

*Primary Examiner*—Stephen K. Cronin
*Assistant Examiner*—Hyder Ali
(74) *Attorney, Agent, or Firm*—Donald Lewis; Alleman Hall McCoy Russell & Tuttle, LLP

(57) ABSTRACT

A system for an engine of a vehicle, comprising of a cylinder located in the engine, a delivery system configured to deliver fuel and a fluid to at least an engine cylinder while the vehicle is traveling, said fluid comprising alcohol and/or water, and a control system for varying an amount of said fuel and fluid delivered to the cylinder in different ratios as a condition varies, said controller further varying a spark timing of a spark in said cylinder as an amount of alcohol and/or water in said fluid varies.

20 Claims, 16 Drawing Sheets

U.S. PATENT DOCUMENTS

| | | |
|---|---|---|
| 4,817,576 A | 4/1989 | Abe et al. |
| 4,930,537 A | 6/1990 | Farmer |
| 4,945,881 A | 8/1990 | Gonze et al. |
| 4,962,789 A | 10/1990 | Benscoter |
| 4,993,386 A | 2/1991 | Ozasa et al. |
| 4,998,518 A | 3/1991 | Mitsumoto |
| 5,017,826 A | 5/1991 | Oshima et al. |
| 5,018,483 A | 5/1991 | Kashima et al. |
| 5,044,331 A | 9/1991 | Suga et al. |
| 5,044,344 A | 9/1991 | Tuckey et al. |
| 5,056,490 A | 10/1991 | Kashima |
| 5,056,494 A | 10/1991 | Kayanuma |
| 5,111,795 A | 5/1992 | Thompson |
| 5,131,228 A | 7/1992 | Mochizuki et al. |
| 5,188,087 A | 2/1993 | Saito |
| 5,204,630 A | 4/1993 | Seitz et al. |
| 5,230,309 A | 7/1993 | Suga et al. |
| 5,233,944 A | 8/1993 | Mochizuki |
| 5,335,637 A | 8/1994 | Davis et al. |
| 5,336,396 A | 8/1994 | Shetley |
| 5,357,908 A | 10/1994 | Sung et al. |
| 5,360,034 A | 11/1994 | Der Manuelian |
| 5,408,979 A | 4/1995 | Backlund et al. |
| 5,417,239 A | 5/1995 | Ford |
| 5,469,830 A | 11/1995 | Gonzalez |
| 5,477,836 A | 12/1995 | Hyodo et al. |
| 5,508,582 A | 4/1996 | Sugimoto et al. |
| 5,565,157 A | 10/1996 | Sugimoto et al. |
| 5,694,908 A | 12/1997 | Hsu |
| 5,740,784 A | 4/1998 | McKinney |
| 5,782,092 A | 7/1998 | Schultalbers et al. |
| 5,806,500 A | 9/1998 | Fargo et al. |
| 5,875,743 A | 3/1999 | Dickey |
| 5,921,222 A | 7/1999 | Freeland |
| 6,112,705 A | 9/2000 | Nakayama et al. |
| 6,112,725 A | 9/2000 | McKinney |
| 6,119,637 A | 9/2000 | Matthews et al. |
| 6,189,516 B1 | 2/2001 | Hei Ma |
| 6,213,086 B1 | 4/2001 | Chmela et al. |
| 6,229,253 B1 | 5/2001 | Iwata et al. |
| 6,234,123 B1 | 5/2001 | Iiyama et al. |
| 6,318,083 B1 | 11/2001 | Machida et al. |
| 6,382,225 B1 | 5/2002 | Tipton |
| 6,494,192 B1 | 12/2002 | Capshaw et al. |
| 6,505,579 B1 | 1/2003 | Lee |
| 6,553,974 B1 | 4/2003 | Wickman et al. |
| 6,617,769 B2 | 9/2003 | Suzuki |
| 6,619,242 B2 | 9/2003 | Kaneko |
| 6,622,664 B2 * | 9/2003 | Holder et al. .................. 123/3 |
| 6,622,690 B2 | 9/2003 | Ando et al. |
| 6,651,432 B1 | 11/2003 | Gray, Jr. |
| 6,659,068 B2 | 12/2003 | Urushihara et al. |
| 6,691,669 B2 | 2/2004 | Surnilla et al. |
| 6,698,387 B1 | 3/2004 | McFarland et al. |
| 6,711,893 B2 | 3/2004 | Ueda et al. |
| 6,792,966 B2 | 9/2004 | Harvey |
| 6,845,616 B2 | 1/2005 | Jauss |
| 6,928,983 B2 | 8/2005 | Mashiki |
| 6,951,202 B2 | 10/2005 | Oda |
| 6,959,693 B2 | 11/2005 | Oda |
| 6,972,093 B2 | 12/2005 | Partridge et al. |
| 6,978,762 B2 | 12/2005 | Mori |
| 6,988,485 B2 | 1/2006 | Ichise et al. |
| 6,990,956 B2 | 1/2006 | Niimi |
| 7,055,500 B2 | 6/2006 | Miyashita et al. |
| 7,082,926 B2 | 8/2006 | Sadakane et al. |
| 7,159,568 B1 | 1/2007 | Lewis et al. |
| 7,178,503 B1 | 2/2007 | Brehob |
| 7,225,787 B2 * | 6/2007 | Bromberg et al. ....... 123/198 A |
| 7,255,080 B1 | 8/2007 | Leone |
| 7,261,064 B2 | 8/2007 | Bhaisora et al. |
| 7,278,396 B2 | 10/2007 | Leone et al. |
| 7,287,492 B2 | 10/2007 | Leone et al. |
| 7,287,509 B1 | 10/2007 | Brehob |
| 7,293,552 B2 | 11/2007 | Leone et al. |
| 2001/0035215 A1 | 11/2001 | Tipton et al. |
| 2003/0089337 A1 | 5/2003 | Cohn et al. |
| 2003/0127072 A1 | 7/2003 | Gmelin et al. |
| 2004/0035395 A1 | 2/2004 | Heywood et al. |
| 2004/0065274 A1 | 4/2004 | Cohn et al. |
| 2004/0083717 A1 | 5/2004 | Zhu et al. |
| 2004/0250790 A1 | 12/2004 | Heywood et al. |
| 2004/0261763 A1 | 12/2004 | Hashimoto et al. |
| 2005/0051135 A1 | 3/2005 | Tomada et al. |
| 2005/0066939 A1 | 3/2005 | Shimada et al. |
| 2005/0097888 A1 | 5/2005 | Miyashita |
| 2005/0103285 A1 | 5/2005 | Oda |
| 2005/0109316 A1 | 5/2005 | Oda |
| 2005/0109319 A1 | 5/2005 | Oda |
| 2005/0155577 A1 | 7/2005 | Ichise et al. |
| 2005/0155578 A1 | 7/2005 | Ichise et al. |
| 2005/0166896 A1 | 8/2005 | Sadakane |
| 2005/0172931 A1 | 8/2005 | Mori |
| 2005/0178356 A1 | 8/2005 | Shibagaki |
| 2005/0178360 A1 | 8/2005 | Satou |
| 2005/0183698 A1 | 8/2005 | Yonezawa |
| 2005/0274353 A1 | 12/2005 | Okubo et al. |
| 2006/0016429 A1 | 1/2006 | Mashiki |
| 2006/0075991 A1 | 4/2006 | Heywood et al. |
| 2006/0090732 A1 | 5/2006 | Shibagaki |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2006/0180099 A1 | 8/2006 | Aimoto et al. |
| 2006/0191727 A1 | 8/2006 | Usami et al. |
| 2007/0028861 A1 | 2/2007 | Kamio et al. |
| 2007/0028905 A1 | 2/2007 | Shinagawa et al. |
| 2007/0034192 A1 | 2/2007 | Kamio et al. |
| 2007/0119391 A1 | 5/2007 | Fried et al. |
| 2007/0119392 A1 | 5/2007 | Leone et al. |
| 2007/0119394 A1 | 5/2007 | Leone |
| 2007/0119411 A1 | 5/2007 | Kerns |
| 2007/0119412 A1 | 5/2007 | Leone et al. |
| 2007/0119413 A1 | 5/2007 | Lewis et al. |
| 2007/0119414 A1 | 5/2007 | Leone et al. |
| 2007/0119415 A1 | 5/2007 | Lewis et al. |
| 2007/0119416 A1 | 5/2007 | Boyarksi |
| 2007/0119421 A1 | 5/2007 | Lewis et al. |
| 2007/0119422 A1 | 5/2007 | Lewis et al. |
| 2007/0119425 A1 | 5/2007 | Lewis et al. |
| 2007/0204813 A1 | 9/2007 | Arai et al. |
| 2007/0215071 A1 | 9/2007 | Dearth et al. |
| 2007/0215072 A1 | 9/2007 | Dearth et al. |
| 2007/0215101 A1 | 9/2007 | Russell et al. |
| 2007/0215102 A1 | 9/2007 | Russell et al. |
| 2007/0215104 A1 | 9/2007 | Hahn |
| 2007/0215110 A1 | 9/2007 | Stein et al. |
| 2007/0215111 A1 | 9/2007 | Surnilla |
| 2007/0215125 A1 | 9/2007 | Dearth et al. |
| 2007/0215127 A1 | 9/2007 | Dearth et al. |
| 2007/0215130 A1 | 9/2007 | Shelby et al. |
| 2007/0219674 A1 * | 9/2007 | Leone .......................... 701/1 |
| 2007/0219679 A1 | 9/2007 | Leone |
| 2007/0219701 A1 | 9/2007 | Hashimoto et al. |
| 2007/0221163 A1 | 9/2007 | Kamio |
| 2007/0234976 A1 | 10/2007 | Dearth et al. |
| 2007/0289573 A1 | 12/2007 | Leone et al. |
| 2007/0295307 A1 | 12/2007 | Kerns |

OTHER PUBLICATIONS

L. Bromberg et al., "Calculations of Knock Suppression in Highly Turbocharged Gasoline/Ethanol Engines Using Direct Ethanol Injection", Jul. 7, 2005, Massachusetts Institute of Technology.

Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

Stephen Russ, "A Review of the Effect of Engine Operating Conditions on Borderline Knock", SAE Technical Paper Series 960497, Feb. 26-29, 1996.

S. Brusca et al., "Water Injection in IC-SI Engines to Control Detonation and to Reduce Pollutant Emissions", SAE Technical Paper No. 2003-01-1912, May 19-22, 2003.

U.S. Appl. No. 60/780,319, filed Mar. 8, 2006, Bromberg et al.
U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
U.S. Appl. No. 12/014,952, filed Jan. 16, 2008, Leone et al.

* cited by examiner

CONTROL FOR KNOCK SUPPRESSION FLUID SEPARATOR IN A MOTOR VEHICLE

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Further, engines have been proposed using more than one type of fuel injection. For example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. are one example. Specifically, the Heywood et al. papers describe directly injecting ethanol to improve charge cooling effects, while relying on port injected gasoline for providing the majority of combusted fuel over a drive cycle. The ethanol provides increased octane and increased charge cooling due to its higher heat of vaporization compared with gasoline, thereby reducing knock limits on boosting and/or compression ratio. Further, water may be mixed with ethanol and/or used as an alternative to ethanol. The above approaches purport to improve engine fuel economy and increase utilization of renewable fuels.

One issue with the above approach is that requiring a user to always provide separate fuels (e.g., gasoline and ethanol) can be burdensome and impede wide-spread acceptance of such fuel economy improving technology. Therefore, in one approach, on-board vehicle separation may be used to take advantage of already available alcohol mixtures, such as E10 (10% ethanol and 90% gasoline) or E85 (85% ethanol and 15% gasoline), while taking advantage of delivering components of the mixture to the engine in varying ratios (and/or through different injectors), for example. However, since the user may provide varying concentrations (e.g., sometimes E85, sometimes E10, and/or sometimes gasoline), the separator may be adjusted based on operating conditions, such as based on the constituents in the fuel tank or engine usage rates. Further, it may be adjusted based on operating conditions of the engine and ambient conditions. In this way, it is possible to improve overall performance by adjusting separator operation to the particular operating conditions of the engine, environment, and supplied fuel mixture by the user.

DETAILED DESCRIPTION

Figure 1:
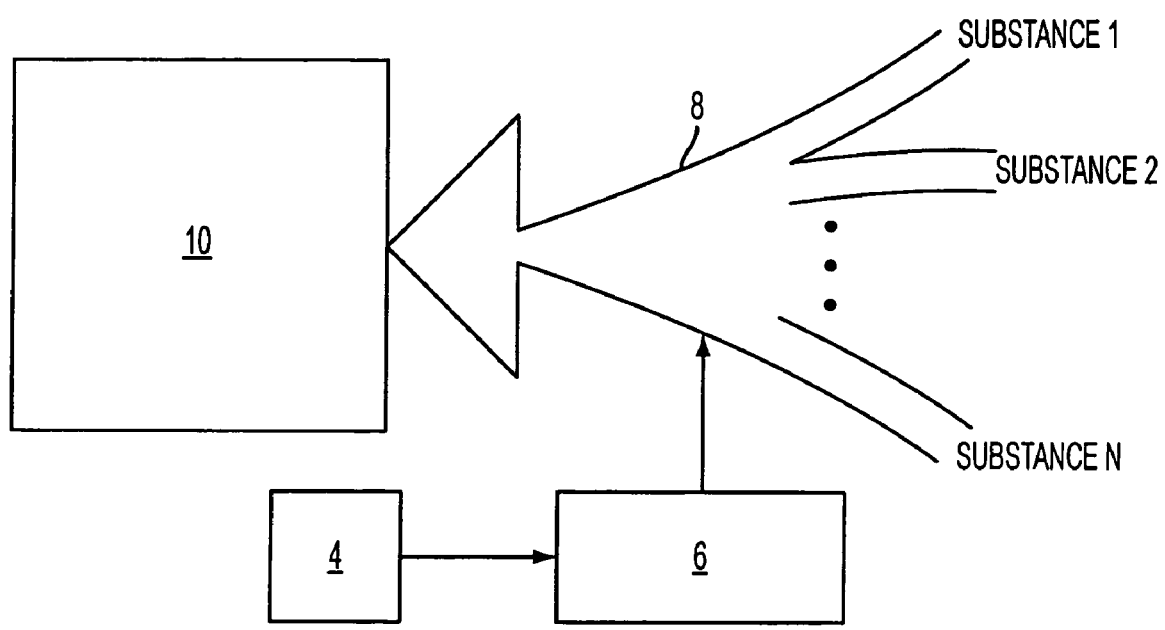
FIG. 1 shows a generic engine system.

FIG. 1 shows an engine 10 receiving delivery of a plurality of substances (1, 2, ..., N) via arrow 8. The various substances may include multiple different fuel blends, injection locations, or various other alternatives. In one example, multiple different substances having different gasoline and/or alcohol and/or water concentrations may be delivered to the engine, and may be delivered in a mixed state, or separately delivered. Further, the relative amounts and/or ratios of the different substances may be variable controlled by a controller 6 in response to operating conditions, which may be provided via sensor(s) 4.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc. as a second substance. In still another example, the first substance may be a gasoline alcohol blend with a lower alcohol concentration than a gasoline alcohol blend of a second substance.

In another embodiment, different injector locations may be used for different substances. For example, a single injector (such as a direct injector) may be used to inject a mixture of two substances (e.g., gasoline and an alcohol/water mixture), where the relative amount or ratio of the two substances in the mixture may be varied during engine operation via adjustments made by controller 6 via a mixing valve (not shown), for example. In still another example, two different injectors for each cylinder are used, such as port and direct injectors, each injecting a different substance in different relative amounts as operating conditions vary. In even another embodiment, different sized injectors, in addition to different locations and different substances, may be used. In yet another embodiment, two port injectors with different spray patterns and/or aim points may be used.

As will be described in more detail below, various advantageous results may be obtained by various of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock (e.g., in response to knock or increased load, increasing a relative amount of alcohol and/or water). This phenomenon, combined with increased compression ratio, and/or boosting and/or engine downsizing, can then be used to obtain large fuel economy benefits (by reducing the knock limitations on the engine), while allowing engine operation on gasoline at lighter loads when knock is not a constraint. However, when combusting a mixture having alcohol, the likelihood of pre-ignition may be increased under certain operating conditions. As such, in one example, by utilizing water instead of or mixed into the substance having alcohol, it may be possible to reduce the likelihood of pre-ignition, while still taking advantage of increased charge cooling effects and the availability of alcohol containing fuels.

Figure 2:
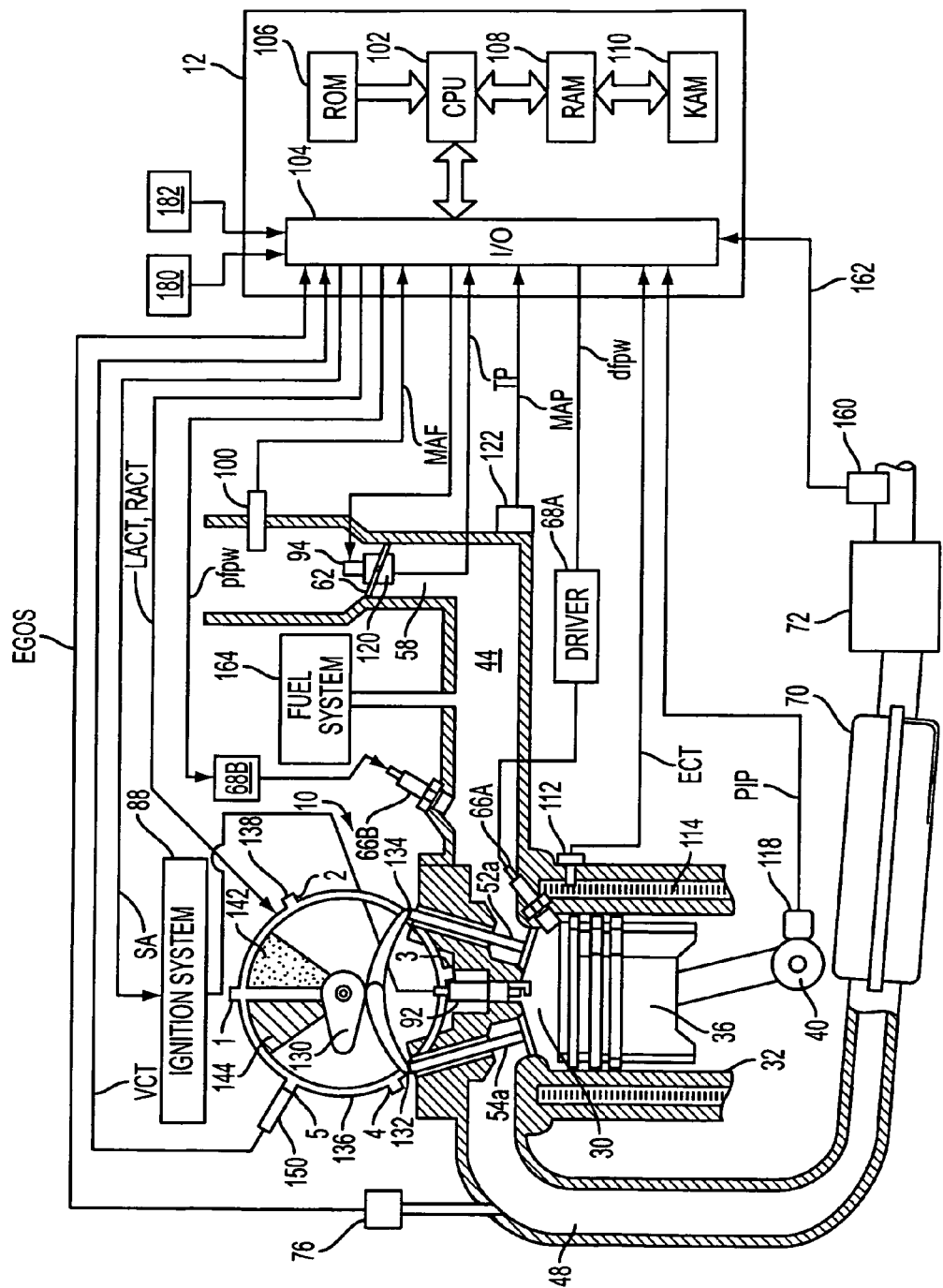
FIG. 2 shows a partial engine view.

Referring now to FIG. 2, it shows one cylinder of a multi-cylinder engine, as well as the intake and exhaust path connected to that cylinder. Further, FIG. 2 shows one example fuel system with two fuel injectors per cylinder, for at least one cylinder. In one embodiment, each cylinder of the engine may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configurations for the fuel vapor purging system and exhaust gas oxygen sensor locations.

Continuing with FIG. 2, it shows a multiple injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68A. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel and/or water may be delivered to fuel injector 66A by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68B. Note that a single driver 68 may be used for both fuel injection systems, or multiple drivers may be used. Fuel system 164 is also shown in schematic form delivering vapors to intake manifold 44, where fuel system 164 is also coupled to injectors 66A and 66B (although not shown in this Figure). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

While FIG. 2 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF)

from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations thereof depending on various factors, to control engine air-fuel ratio.

Figure 3:
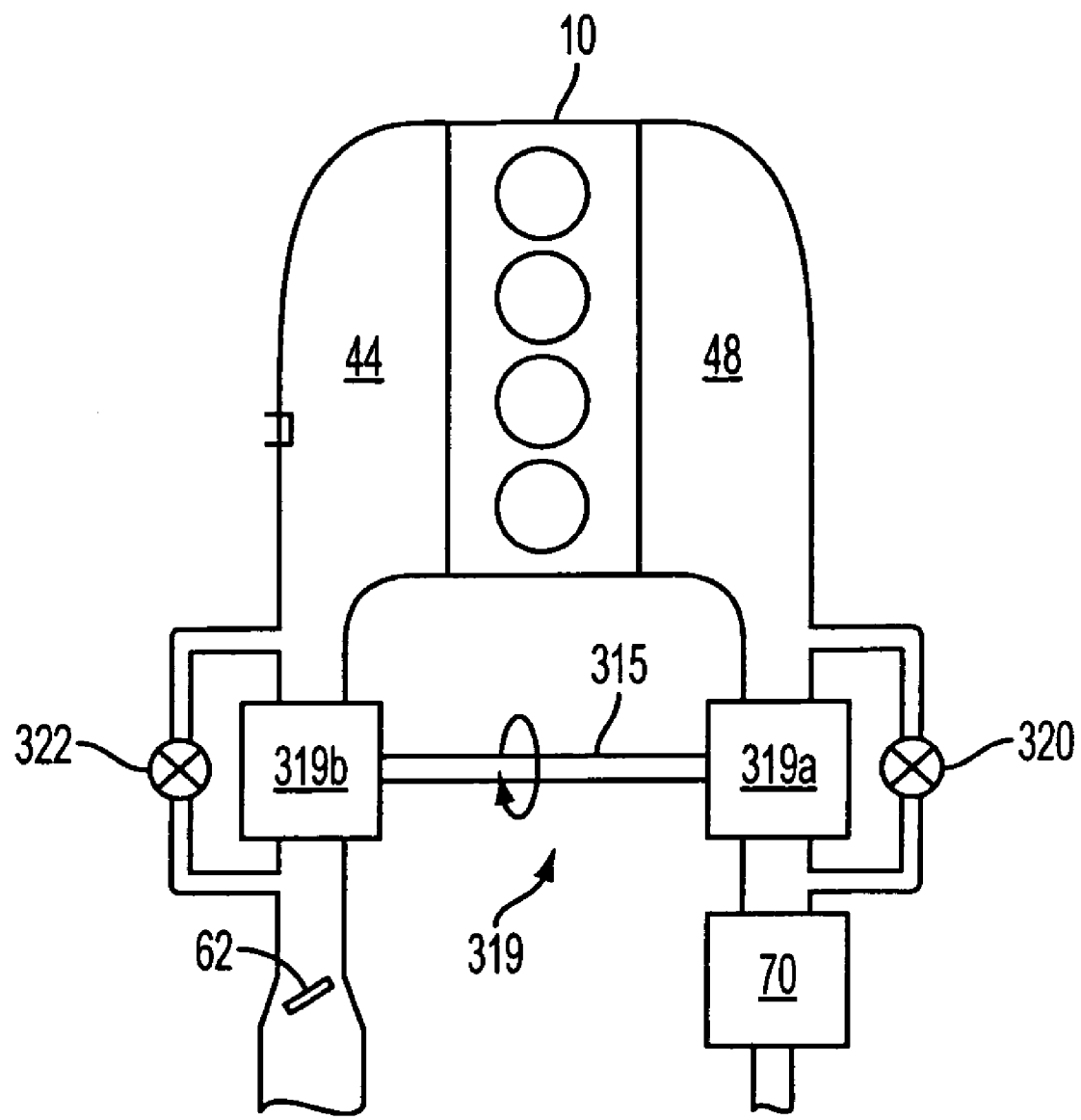
FIG. 3 shows an engine with a turbocharger.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. While not shown in FIG. 2, engine 10 may be coupled to various boosting devices, such as a supercharger or turbocharger, as shown in FIG. 3. On a boosted engine, desired torque may also be maintained by adjusting wastegate and/or compressor bypass valves.

Referring now specifically to FIG. 3, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4:
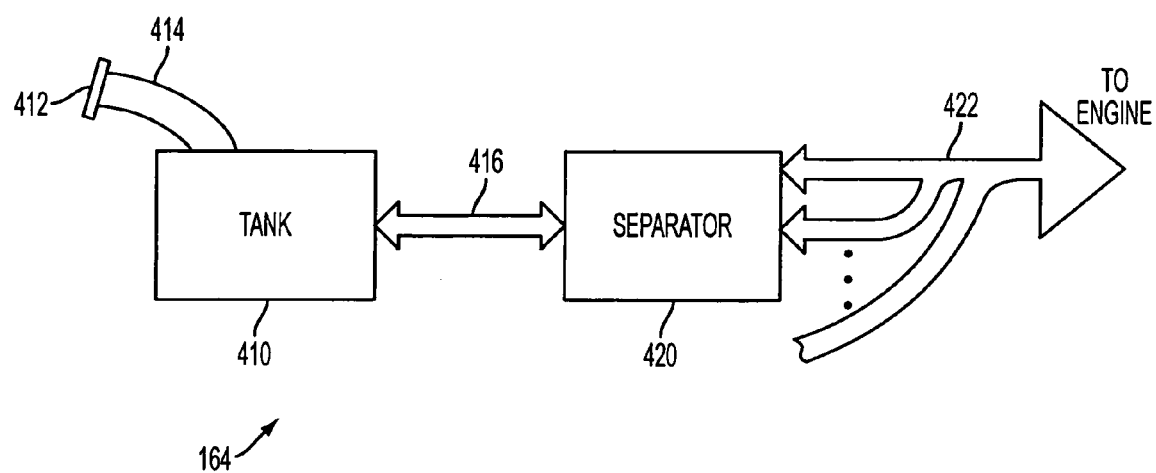
FIG. 4 shows an example fuel system layout.

Referring now to FIG. 4, an example fuel system layout is provided with fuel tank 410 having fuel fill cap 412. The system is configured to receive a fuel mixture through the fill line 414 and into tank 410, where the mixture may be a gasoline/alcohol mixture, a gasoline/alcohol/water mixture, or various others such as noted herein, including, a gasoline/ethanol mixture such as E10, for example. The fuel mixture in tank 410 may be transported to a separate system 420 via a transport system, shown by double arrow 416. The transport system 416 may be a one way transport, e.g., transporting the fuel mixture to the separator, or may enable two-way transportation, such as return lines from the separator or downstream fuel system back to the tank 410. The transport system 416 may include pumps, valves, multiple separate lines, or various other components, such as described below herein with regard to example systems. Further, while FIG. 4 shows the transport system 416 external to tank 410, system 416 along with separate 420 and/or portions of transport system 422 may also be located within or at least partially within tank 410.

Separator 420 may include various types of separator system. The separator system is generally configured to allow two or more components in the fuel mixture stored in tank 410 to be separated and provided separately to engine 10, thereby permitting the advantages of multiple or mixed injection strategies to be employed without causing inconvenience to a user. In one example, the separator system utilizes an aqueous extraction to remove fuel components soluble in water (such as methanol, ethanol, etc.) from fuel components not soluble in water. For example, an extraction fluid (e.g., water) may be added to a gasoline/alcohol mixture, and the mixture drawn off at different levels, where the lower level provide an alcohol enriched substance. In another example, a barrier in a tank may be used, where the barrier is made at least partially of a material or materials that selectively transports one component of the mixed fuel at a higher rate than, or even to the substantial exclusion of, the other component of the mixed fuel. In still another example, the barrier may be an ionically or electrically conductive polymeric or inorganic material, polypyrole being one example of a conductive polymer. A voltage and/or current may be applied across and/or through the membrane using a voltage and/or current supply, respectively. In this way, substances may be extracted at different rates and/or concentrations, for example.

Figure 5:
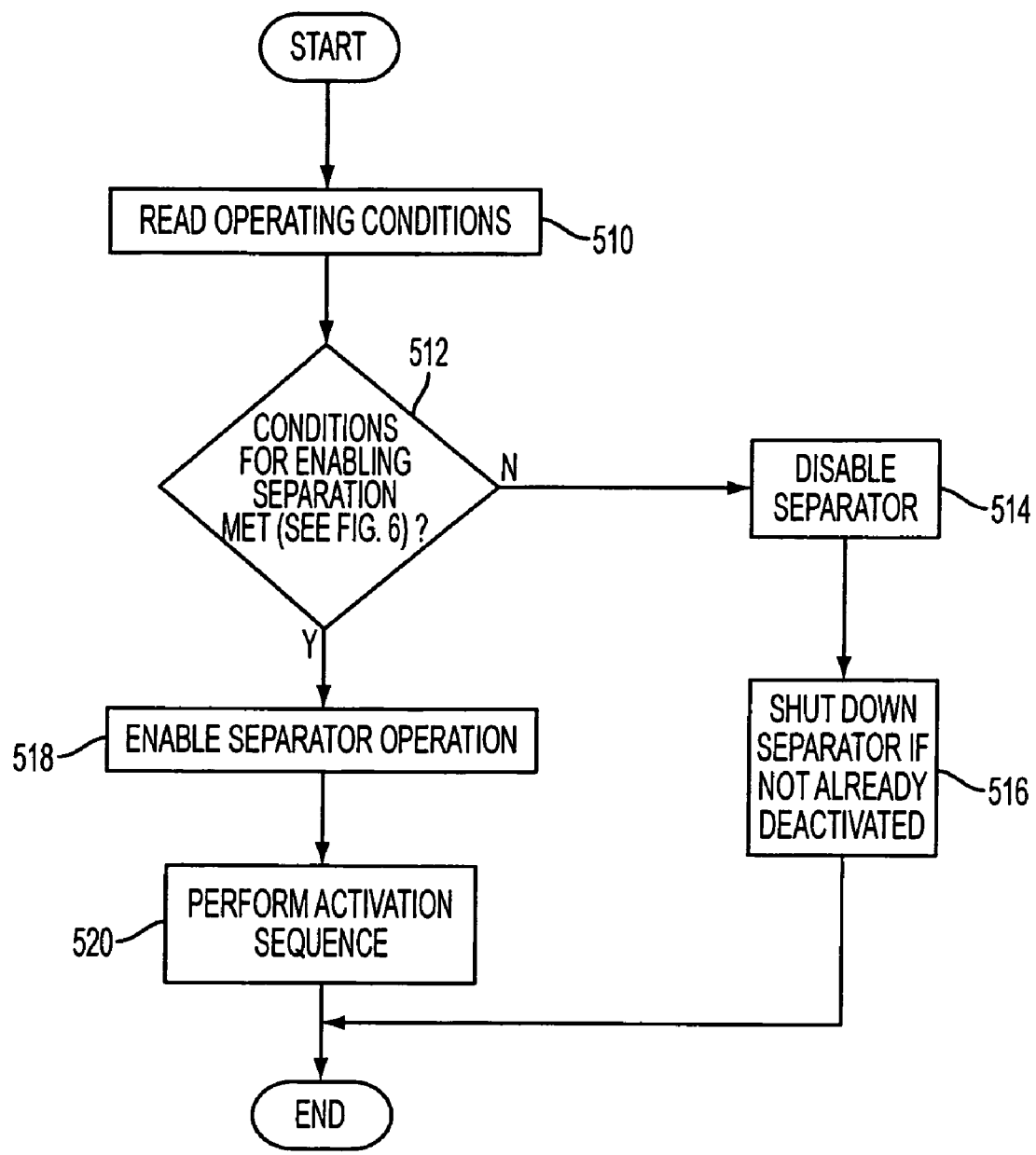
FIGS. 5-6 show example enablement routines.

Continuing with FIG. 4, it also shows downstream transport system 422 located between separator 420 and the engine (not shown). Transport system 422 is shown having at least two separate lines coupled to the separator to transport different amounts of substances with different constituents to the engine depending on operating conditions. Transport system 422 may maintain the different substances separate in delivering the substances to the engine, or may mix the substances for co-delivery to the engine, as illustrated in FIG. 4. Further, like system 416, system 422 may include pumps, valves, multiple separate lines, return lines, or various other components, such as described below herein with regard to example systems Referring now to FIGS. 5-6, example routines for controlling system operations are provided, in particular for enabling and controlling separator operation. In 510, the routine reads operating conditions, such as those noted below in FIG. 6. Then, in 512, the routine determines whether conditions for enabling separator operation are met. Various conditions may be used to enable/disable separate operation, such as those noted with regard to FIG. 6. If the answer to 512 is no, the routine continues to 514 to disable separator operation and then to showdown the separator in 516 if it is not already deactivated. The shutdown may be a gradual shutdown, or may be adjusted depending on the operating conditions. For example, under some conditions, a more rapid shutdown may be used than other conditions.

If the answer to 512 is yes, the routine continues to 518 to enable separator operation. Then in 520, the routine performs an activation sequence to activate the separator if it is not already active. The activation sequence may include warm-up operation to initiate separation, and may be adjusted depending on engine, vehicle, and/or ambient operating conditions. For example, the separator may have a more rapid activation sequence under warmer ambient conditions.

Figure 6:
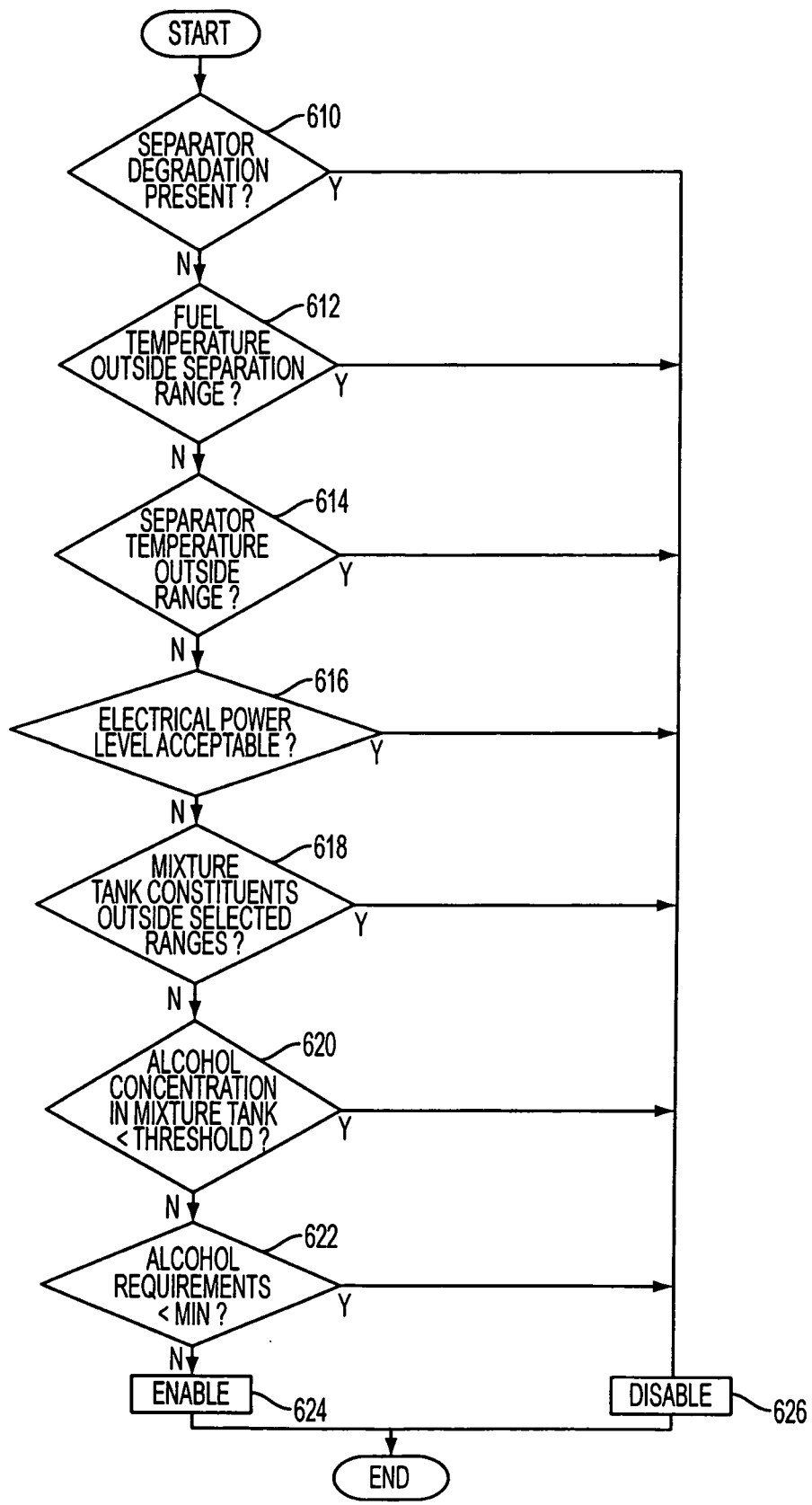

Referring now to FIG. 6, details of the separator enablement are described. While the following conditions may be used to enable/disable separator operation, various other, or alternative combinations of these parameters may be used. In 610, the routine first determines whether separator degradation has occurred or been detected. Degradation may be detected in a variety of ways, such as based on measured separator operation compared to expected operation for a given set of conditions. For example, the routine may monitor separator performance, fuel separation rate, fuel separation percentage yield, or various others. If the answer to 610 is no, the routine continues to 612 to determine whether fuel temperature is outside a range for separator operation. The range may vary with operating conditions such as an estimate of fuel types in the tank or separator, relative fuel quantities, in the tank or separator, or various others.

If the answer to 612 is no, the routine continues to 614 to determine whether the separator and/or any of its components are outside a temperature range for separator operation. Again, the range may vary with operating conditions such as an estimate of fuel types in the tank or separator, relative fuel quantities in the tank or separator, engine operating conditions, or various others.

If the answer to 614 is no, the routine continues to 616 to determine how in the case of an electrically actuated separator, electrical power related values compare to acceptable values or thresholds. For example, the routine may determine whether the amount of energy used by the separator in separating the current fuel under the current conditions is less than a threshold value. Alternatively, the routine may consider vehicle battery voltage, state of charge, and/or electrical power generation conditions. For example, if battery voltage or state of charge is above a threshold valve, separator operation may be enabled.

If the answer to 616 is no, the routine continues to 618 to determine whether tank fuel mixture constituents are outside selected ranges in which separator operation is performed. For example, if a certain constituent to be separated is below a certain relative amount in the incoming fuel, separation may be disabled due to low yields. Alternatively, if another constituent is above a threshold valve, separation may be disabled due to interference in separation performance.

If the answer to 618 is no, the routine continues to 620 to determine whether, in the case of alcohol separation, an alcohol concentration in the fuel tank mixture is less than a threshold value. For example, if the amount of alcohol in the mixture is below a threshold, separation may be disabled due to low alcohol availability.

If the answer to 620 is no, the routine continues to 622 to determine whether, in the case of alcohol separation, alcohol requirements are less than a threshold value. For example, if the engine and/or vehicle are operating under conditions in which a separated alcohol mixture is not needed, or only minimally needed, separation may be disabled. In one example, if the engine coolant temperature is less than a minimum temperature (e.g., during a cold start), the separated mixture may not be used, and thus the separator may be disabled. Likewise, if the separated mixture is delivered via a separate injection system that has degraded, separator operation may be disabled.

From a yes answer to any of 610 through 622, the routine continues to 626 to disable separation. Alternatively, if the answer to 622 is no, the routine continues to 624 to enable separator operation. In this way, it is possible to provide appropriate operation of the separator in the context of vehicle operation and degradation over vehicle life.

Figure 7:
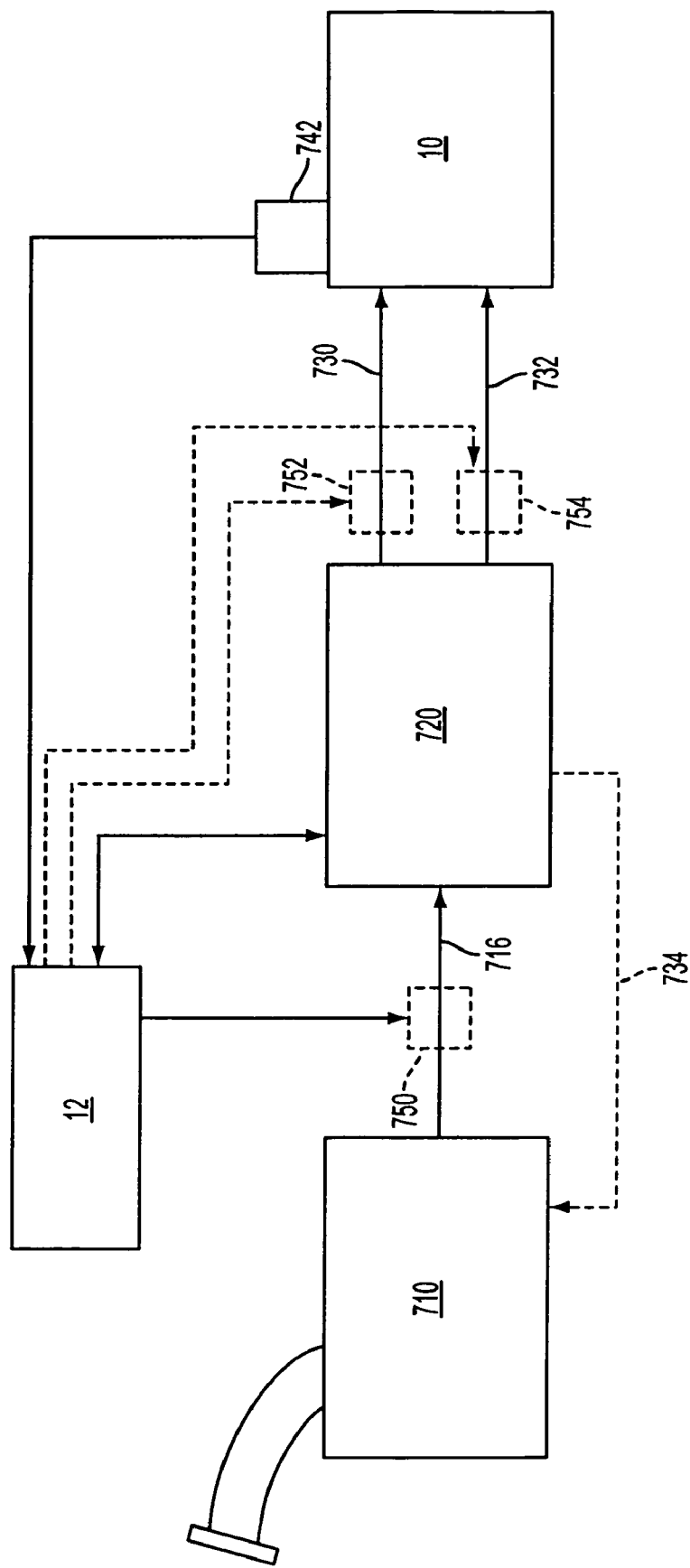
FIGS. 7, 9, and 11 show alterative fuel system layouts.
Figure 9:
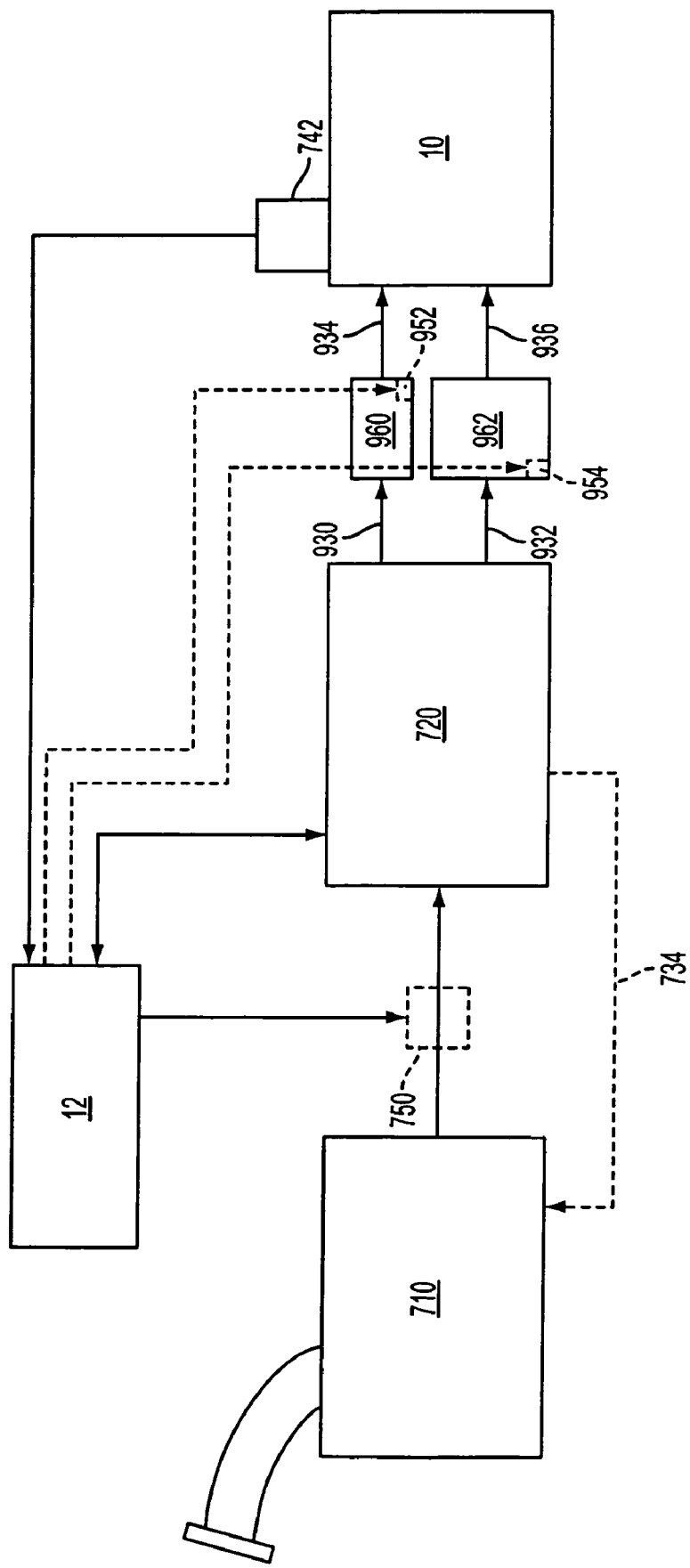
Figure 11:
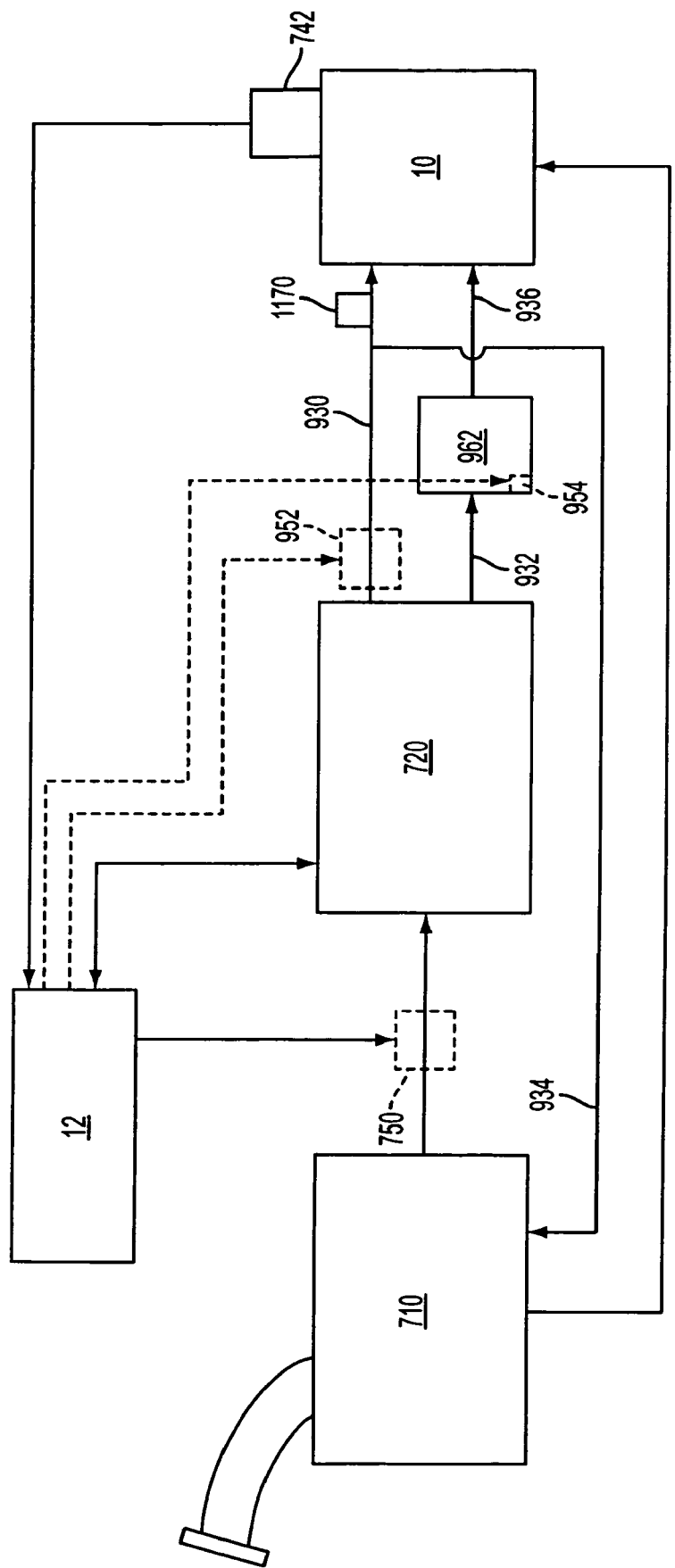

Referring now to FIGS. 7, 9, and 11, example fuel systems are illustrated, along with associated control routines for separator and/or engine control.

Specifically, FIG. 7 illustrates an example fuel system layout in which a separator 720 is used to separate at least ethanol from a fuel mixture in tank 710 having at least gasoline and ethanol. In one example, the separator may receive as an input a gasoline/ethanol mixture 716 with a first ethanol concentration and generate two output gasoline/ethanol mixtures (730, 732), one with a second ethanol concentration and one with a third ethanol concentration. In one example, the third ethanol concentration is higher than the first ethanol concentration, which is higher than the second ethanol concentration. The two outputs mixtures are fed to engine 10, for example, output 730 may be fed to a port fuel injector (e.g., 66A) and output 732 may be fed to a direct injector (e.g., 66B).

In one example, a pump 750 may be provided to pressurize the mixture 716, shown in dashed lines. In addition, or alternatively, pumps 752 and 754 may be provided in 730 and 732, respectively. The pump(s) may be controlled via controller 12, which also receives various inputs, such as information from sensor(s) 742. Further, controller 12 may control separator 720, in addition to engine and/or vehicle operation.

For the example system of FIG. 7, it may advantageously be used in the case that the separate can generate sufficient quantities of a higher alcohol concentration fuel mixture to handle a substantial portion of engine and/or vehicle operation, and as such an additional storage tank for one or both of mixtures 730 and 732 is not required (although it may be added, if desired).

In this case, one optional control strategy for the separator may include operating the separator at various production/generation rates and/or concentrations depending on engine fueling requirements and operating conditions. In one embodiment, the controller may operate the separator in a manner sufficient to produce a required alcohol amount for the current engine operating conditions or current engine fueling demand. The current engine demand could be determined from the engine controller, or calculated from injector pulsewidth and fuel pressure. Alternatively, feedback control of fuel pressure or another parameter could be used to supply enough production to meet demand and maintain pressure.

For example, in the case where the mixture in 732 has a higher alcohol concentration than that of 730, the separator may be controlled in response to which mixture is limiting. In other words, in the case where mixture 732 is being used faster than generation/separation, the separator may be adjusted to increase the amount of mixture 732. Likewise, in the case where mixture 730 is being used faster than generation/separation, the separator may be adjusted to increase the amount of mixture 730. In these cases, return lines (not shown) may be used to return excess amounts of mixtures 730 and/or 732 to tank 710.

If the separator transient response is slower than required for the engine, feed forward controls can be used, where a predicted demand is calculated based on current and/or past operating conditions, as well as adaptive learning, for example. In another example, this may involve predictions of future engine demand based on recent demand, earlier patterns of demand, fuzzy logic, etc. Alternatively, the separator could always operate at a higher rate than currently necessary (with unused ethanol returned to the tank via optional return line 734). The amount of excess separation could also be varied based on operating conditions such as recent demand, earlier patterns of demand, fuzzy logic, etc. In still another alternative, the amount of excess separation/generation could be a function of current demand for mixture 732, engine speed/load/temperature, and/or combinations thereof.

The level of detail in control adjustments and/or accuracy desired may depend on parasitic losses of the ethanol separator. For example, in the case of an electrically actuated/powered separator, if the separator electric power or other input requirements are relatively low (e.g. less than a threshold value), the separator may operate whenever the engine is running, or with simple on/off control whenever some ethanol is demanded. However, if parasitic losses are greater, two or three level modulation of the separator may be used. Further, if parasitic losses are still greater, then the more detailed enablement of FIG. 6 may be used, along with the varying operation of FIG. 8 may be used to reduce the losses by operating with reduced excess separation and with the level of separation matched to current and/or future predicted operating conditions.

Figure 8:
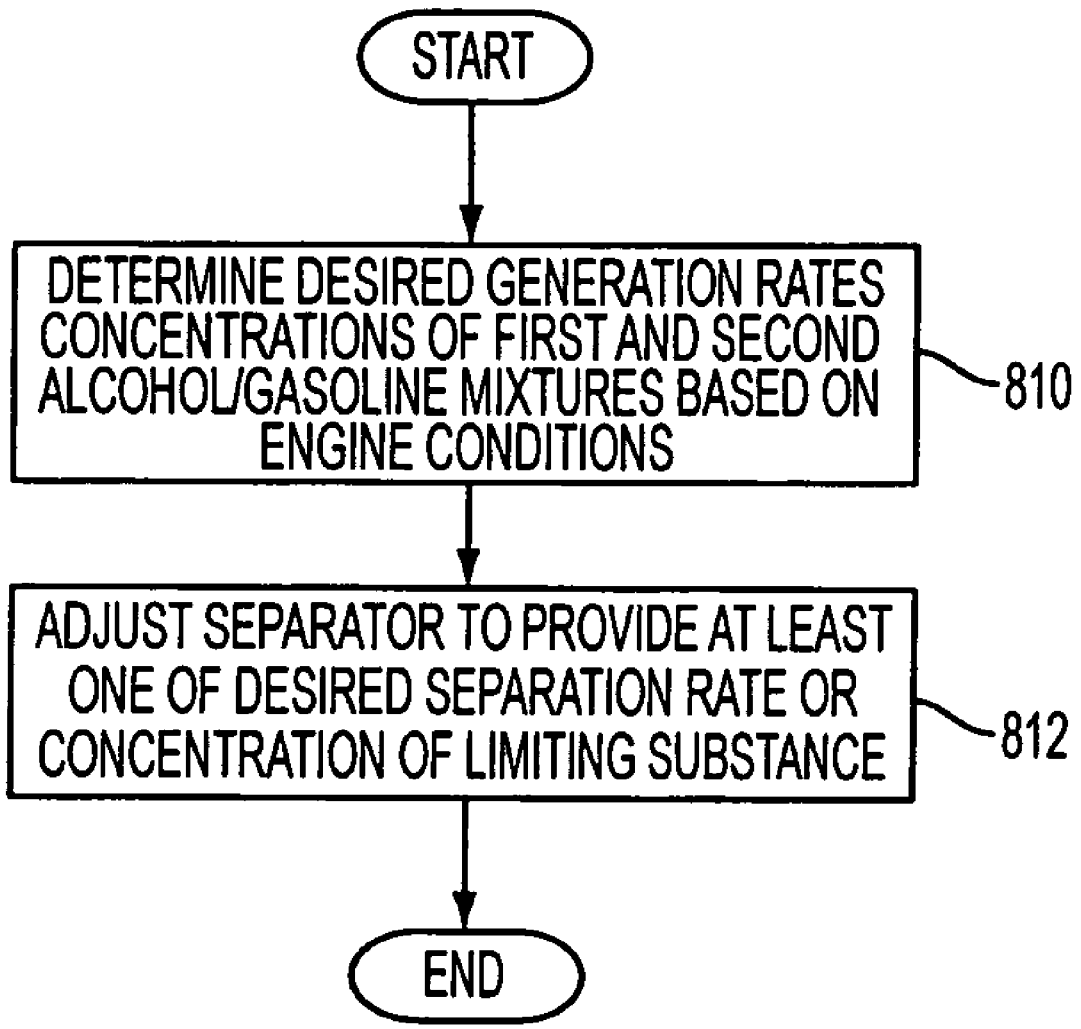
FIGS. 8, 10, and 12 show separator control routines for various fuel system layouts.

Specifically, with regard to FIG. 8, a routine is described for controlling separator operation, such as for the configuration of FIG. 7. In 810, the routine determines a desired generation rate of a first and second mixture from the separator based on operating conditions, such as engine demand, fueling demand, driver input, and/or combinations thereof as noted above herein. Further, in addition to a desired generation rate, the routine may also determine a desired concentration of the output mixtures. In addition, the routine may determine which desired rate is limiting the generation rates of multiple output mixtures which are interdependent. Then, in 812, the routine adjusts the separator to provide at least one of the desired generation rates (or concentrations) of the limiting mixture.

Referring now to FIG. 9, another example fuel system is provided similar to that of FIG. 7, except that each of two output mixtures 930 and 932 having respective storage tanks 960 and 962 to enable buffering of the generation rate from the engine usage rate. In this way, it is possible to provide more consistent generation rate and thereby improve generation efficiency under selected conditions. Specifically, in FIG. 9, two storage tanks 960 and 962 (each having an optional pump 952 and 954 therein, respectively) receive outputs from separator 720 via lines 930 and 932, respectively, and provide mixtures 934 and 936 to engine 10. As noted above, the mixture of 934 may be fed to a port injector of a cylinder, and the mixture of 936 may be fed to a direct injector in a cylinder in engine 10.

Due to the ability to store both of the generated mixtures, with this fuel system it may be possible to control separator 720 to provide improved generation efficiency, while also providing sufficient generation to maintain sufficient fuel mixtures in both tanks 960 and 962.

Figure 10:
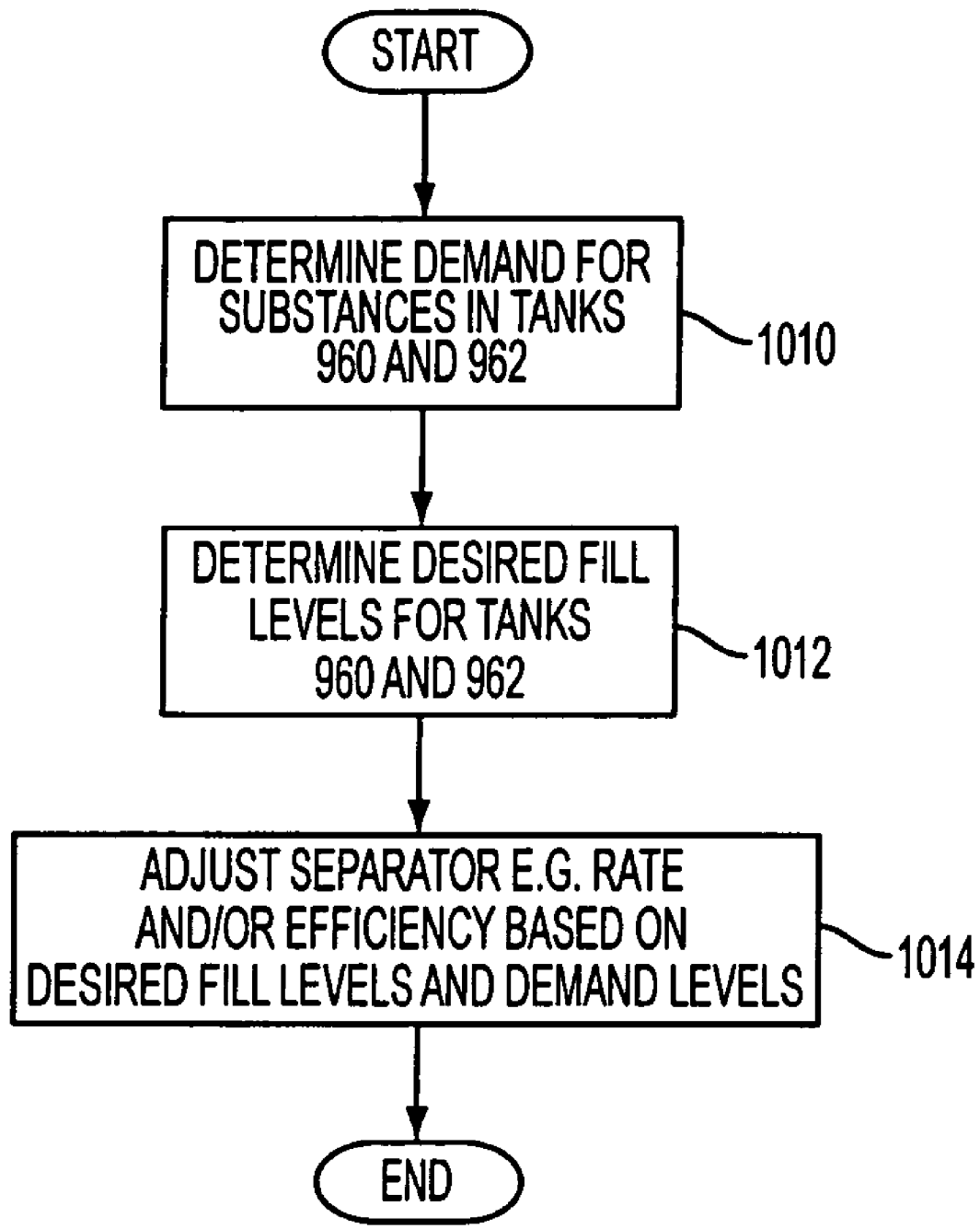

Referring now to FIG. 10, a routine is described for controlling at least separator operation. Specifically, in 1010, the routine determines demand levels for the substances of tanks 960 and 962, respectively. As noted herein, the demand may be based on current or predicted engine fueling requirements, torque requests, or various others.

Next, in 1012, the routine determines the desired fill levels of tanks 960 and 962, respectively, which may be based on current engine, vehicle, and/or ambient operating conditions. Then, in 1014, the routine adjusts separator operation (e.g., separator rate, efficiency, or other) based on the desired fill levels and demand levels. For example, it may be desirable to provide sufficient fuel in tank 960 (which may be gasoline with a lower alcohol concentration than provided or in tank 962), which may be preferable to improve fuel vaporization and transient A/F control under selected conditions, and therefore reduce exhaust emissions for a cold start. For example, in this case, the separator controls may continue operating the separator when tank 962 is sufficiently filled, so that sufficient fuel is stored in tank 960 for the next cold start.

As another example, the separator may shift production between the higher and lower alcohol concentration outputs so as to not overfill either of tanks 960 or 962. Or the separator may be operated to ensure sufficient alcohol-rich mixture in tank 962 for one or more wide-open throttle accelerations to highway speed.

Referring now to FIG. 11, another example fuel system is provided similar to that of FIGS. 7 and 9, except that only one of two output mixtures (932) has a storage tank 962 to enable buffering of the generation rate from the engine usage rate. In this way, it is possible to provide more consistent generation rate of the mixture in 932 and thereby improve generation efficiency under selected conditions, while reducing system storage costs, since the excess generation from the other output mixture 930 is returned to tank 710 via line 934, e.g., using pressure regulator 1170.

In one example, such a system can reduce the system size and cost and packaging space by avoiding the separate tanks used in FIG. 9.

Figure 12:
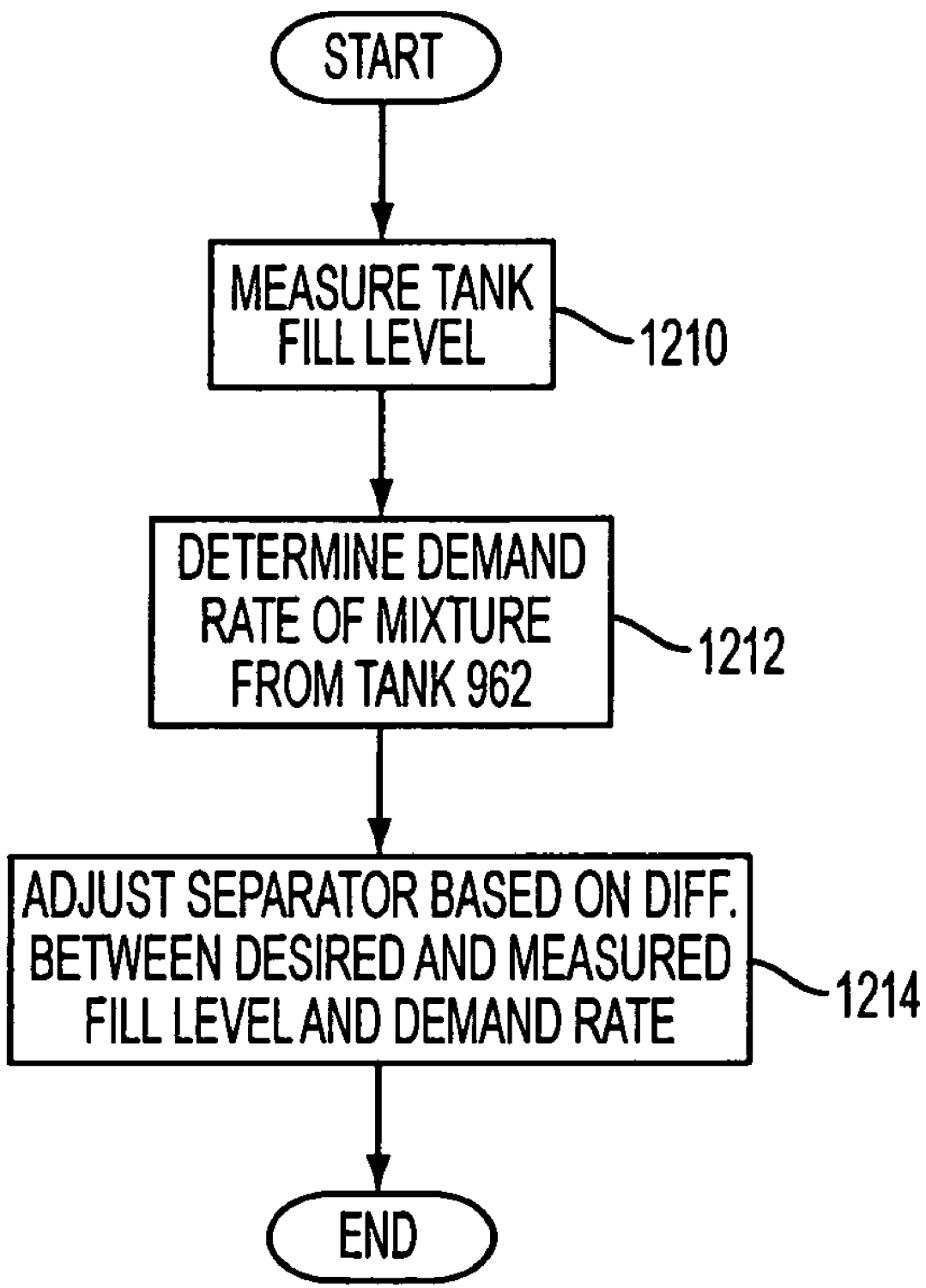

One example control routine for the configuration of FIG. 11 is illustrated in FIG. 12. In one embodiment, the control routines may maintain sufficient mixture level in tank 962 with the higher alcohol concentration (e.g., ethanol) to power the engine for one or more wide-open throttle accelerations to highway speed. Again, different control actions may be taken to account for variation of the size and the parasitic losses of the separator. For example, if the separator requires low electric power or other inputs, it may operate whenever tank 962 is less than full (and optionally with some hysteresis).

Figure 13:
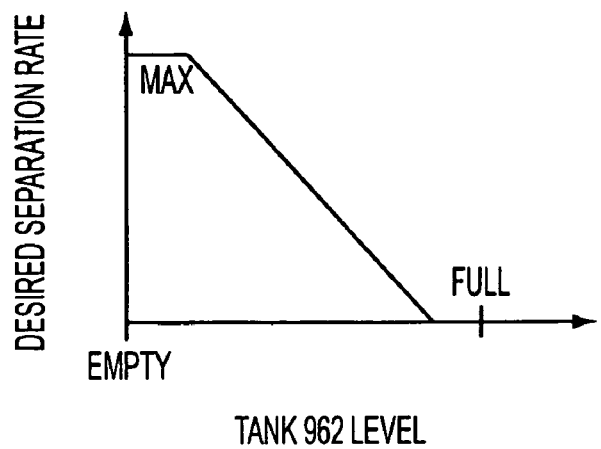
FIGS. 13, 14, and 15 show graphs of example parameter variation.
Figure 14:
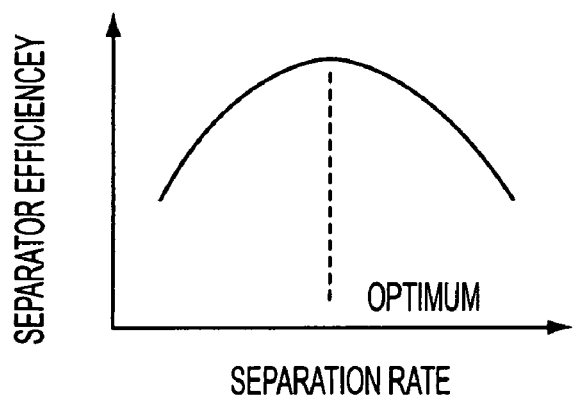
Figure 15:
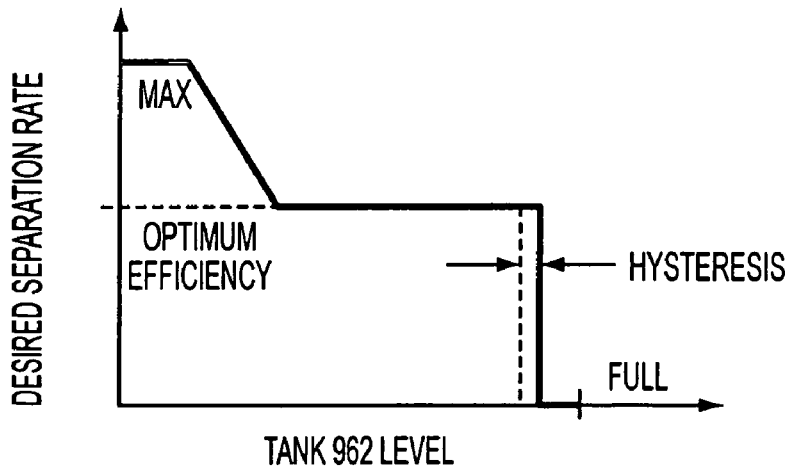

Alternatively, if parasitic losses are higher, and/or if separator efficiency is a function of separation rate, then additional control actions may be taken. For example, more sophisticated controls described below may be used to minimize the losses. Regardless of efficiency, the separator may be operated at maximum or increased separation rate whenever tank 962 is below a threshold value, which may be near empty. If parasitic losses are proportional to separation rate, then the separator may be controlled to make separation rate substantially inversely proportional to tank level, as shown in FIG. 13. If separator efficiency is maximum at some intermediate separation rate as shown in FIG. 14, the controls may maximize or increase time spent at or near that rate, as shown in FIG. 15. Further, combinations of the above controls may be used. Further still, the above control adjustments to separation rate may be translated into a feedback control routine for controlling fill level of one or more tanks by adjusting the separator and/or other operating parameters.

Returning to FIG. 12, in 1210 the routine determines or measures a current tank fill level of tank 962. Next, in 1212, the routine determines a demand rate of fuel from tank 962 based on operating conditions, including current and/or predicted conditions, for example. Then, in 1214, the routine adjusts separator operation based on a difference between a desired fill state (e.g., full, or partly filled) and the measured fill level, as well as based on the demand rate. In this way, it is possible to take into account both engine demand and tank fill conditions to provide sufficient and more efficient separation.

Figure 16:
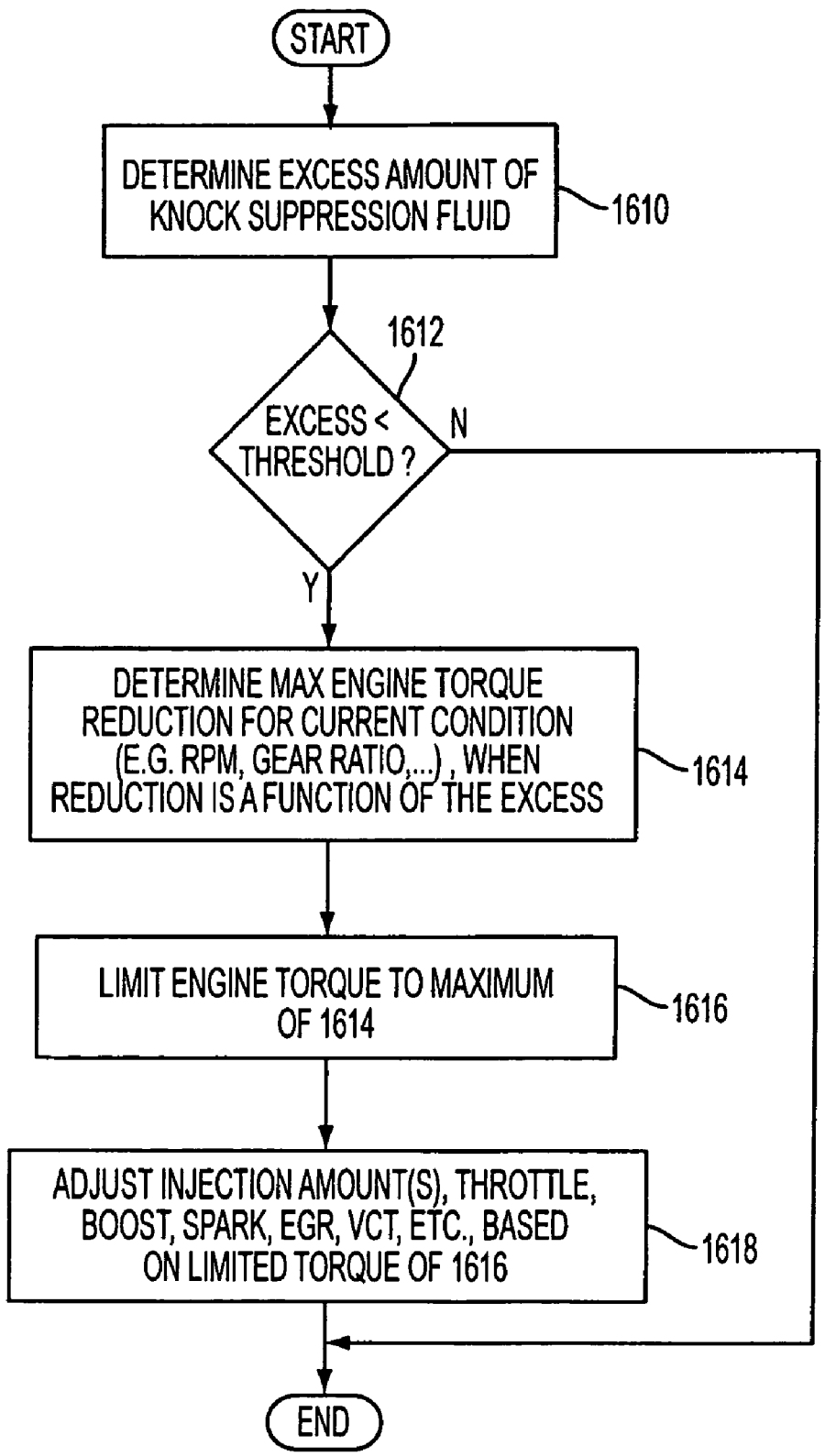
FIG. 16 shows an example routine for controlling engine and separator operation.

Referring now specifically to FIG. 16, a routine is described for adjusting engine output limits, and thus usage rate of a knock suppression fluid, based on an amount of storage of the knock suppression fluid, such as a level in tank 962, for example. Specifically, the routine adjusts operation to reduce sudden decreases in peak engine output caused by sudden unavailability of the knock suppression fluid (e.g., due to depletion).

Figure 17:
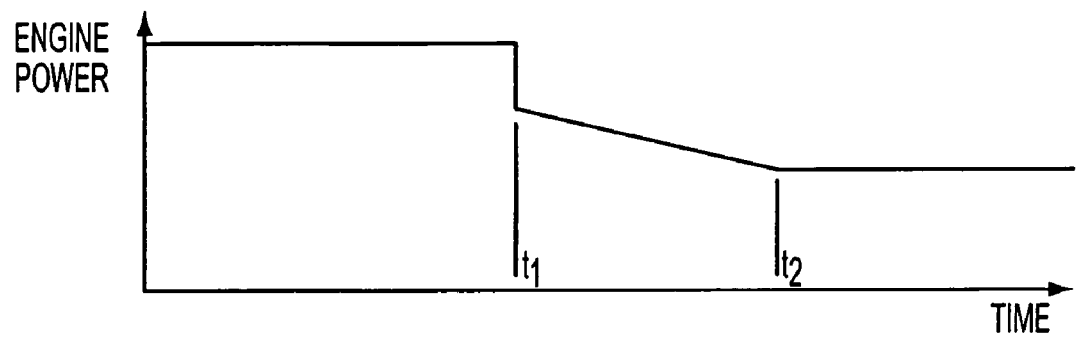
FIGS. 17-20 are graphs illustrating example operation with respect to FIG. 16.

In other words, as shown by the graph of FIG. 17, in the case of continuous high engine power demand, if a secondary fluid, such as a knock suppression fluid, is used indiscriminately, abrupt decreases in engine power may occur. For example, before time t1, sufficient knock suppression fluid is available and being used to enable operation at a high engine power. However, at time t1, the storage is depleted and the usage rate is limited by the separator rate (here it is assumed that the rate decreases due to a decrease in separator performance as the knock suppression substance in the tank is depleted). Then, at time t3, there is no substance to be separated left in the tank (e.g., 410, 710).

Figure 18:
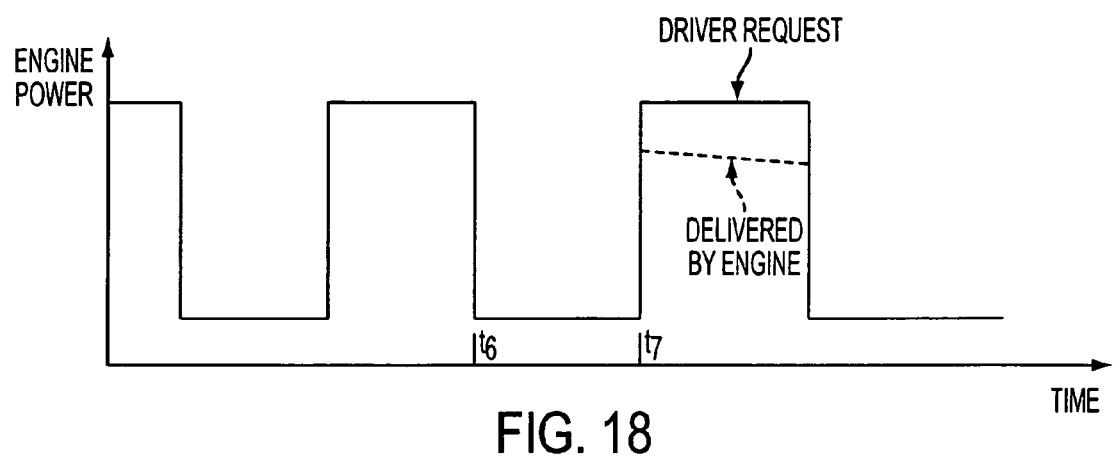

Likewise, in another example of intermittent high engine output demand, again the driver may experience an abrupt decrease in available engine output as illustrated in FIG. 18. This graph illustrates that at time t6, the knock suppression fuel is depleted, and thus at t7, the driver suddenly discovers a power loss. Specifically, before t6, the solid line indicating driver request and the dashed line indicated output delivered by the engine are aligned, whereas at t7, there may be a substantial difference.

In another embodiment, the routine adjusts engine operation (e.g., delivery of gasoline and a knock suppression fluid such as separated ethanol), based on the level of storage. Specifically, in 1610, the routine determines an excess amount of knock suppression fluid, such as an amount stored in a tank greater than a minimum level. Next, in 1612, the routine determines whether the excess is less than a threshold value in 1612. If not, the routine ends. Otherwise, the routine continues to 1614 to determine a maximum engine torque reduction for the current conditions, where the reduction may be a function of the excess. For example, the reduction may be proportional to the excess, where with a larger excess, the reduction is smaller and with a smaller excess, the reduction is greater. Further, the current conditions considered may include engine speed (RPM), gear ratio of a transmission, and others. Next, in 1616, the routine limits engine torque via the reduction of 1614, and then in 1618 the routine adjusts injection amount(s), throttle angle, boost amount, spark timing, exhaust gas recirculation amount, cam timing and/or valve timing, and others based on the limited torque value of 1616.

Figure 19:
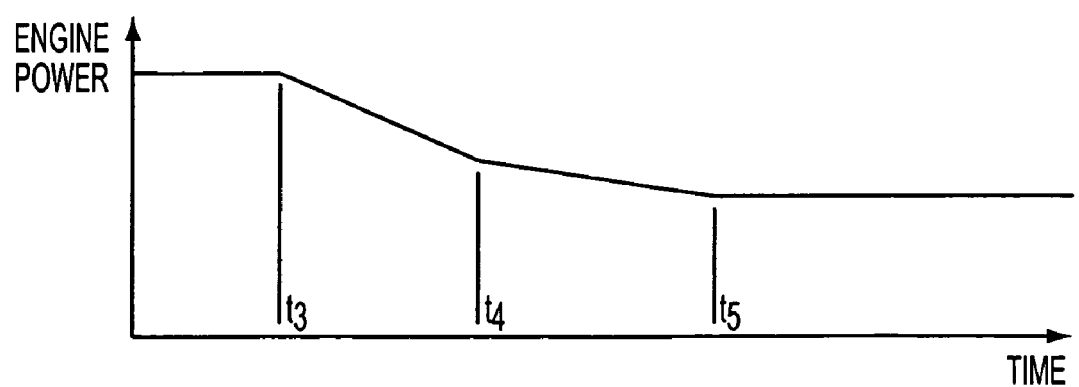
Figure 20:
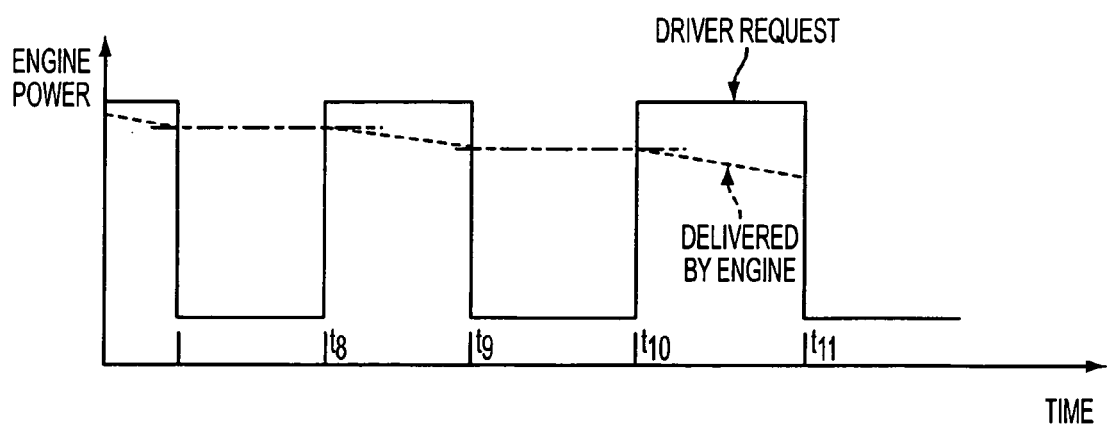

In this way, a gradual reduction in engine output and vehicle performance can be provided, thus reducing abrupt changes that may be more objectionable to a vehicle operator. For example, as shown in FIG. 19 (which shows an example similar to that of FIG. 17), full output may be provided up to time t3, and then it may be more gradually reduced to time t4 before emptying storage of a knock suppression fluid, where time t4 is generally longer than t1 of FIG. 17. Again, after t4, the separator capability dictates usage rates until t5 when there is no substance to be separated left in the tank. Likewise, FIG. 20 shows a graph similar to FIG. 18, but using a control routine to provide gradual power decrease over a plurality of intermittent high power output requests. Specifically, between each of t8 and t9, and t10 and t11, a gradual decrease is provided. Further, the dash dot lines illustrates that the driver is able to return to a peak torque or power near that previously provided.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders (e.g., half) are deactivated by deactivating intake and exhaust valves for those cylinders. In this way, improved fuel economy may be achieved. However, as noted herein, in one example injection using multiple types of fuel delivery (e.g., fuel composition or delivery location) can be used to reduce a tendency of knock at higher loads. Thus, by operating for example with direct injection of water and/or a fuel containing alcohol (such as ethanol or an ethanol blend) during cylinder deactivation operation, it may be possible to extend a range of cylinder deactivation, thereby further improving fuel economy.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12. Further still, while the various routines may show a "start" and "end" block, the routines may be repeatedly performed in an iterative manner, for example.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle traveling on the road, comprising:
   receiving a fuel mixture, said mixture having at least some alcohol;
   separating said fuel mixture into at least a first and second mixture on board the vehicle, where said first mixture has a higher alcohol concentration than said second mixture;
   varying an operating parameter of the separation to vary the fuel separation in response to a vehicle operating condition; and
   delivering a first amount of said first mixture and a second amount of said second mixture to the engine in different ratios.

2. The method of claim 1 wherein said alcohol includes ethanol.

3. The method of claim 1 wherein said separation is via an electrically actuated membrane.

4. The method of claim 1 wherein said ratio changes in response to engine knock and engine load.

5. The method of claim 1 wherein said mixture includes water.

6. The method of claim 1 wherein said operating condition is a fuel tank fill level.

7. The method of claim 1 wherein said operating condition is an engine fueling demand.

8. The method of claim 1 wherein said operating condition is an ambient condition.

9. The method of claim 3 wherein said operating parameter of the separation is a voltage applied to said membrane, and said separator at least partially separates ethanol and gasoline.

10. The method of claim 1 wherein said operating parameter of the separation is a generation rate of one of said first and second mixtures.

11. The method of claim 1 wherein said operating parameter of the separation is a concentration of one of said first and second mixtures.

12. The method of claim 1 further comprising storing at least one of said first and second mixtures in a tank in the vehicle.

13. A method for a vehicle traveling on the road, comprising:
receiving a fuel mixture, said mixture having at least some alcohol;
separating said fuel mixture into at least a first and second mixture on board the vehicle, where said first mixture has a higher alcohol concentration than said second mixture;
varying an operating parameter of the separation in response to a vehicle operating condition; and
delivering a first amount of said first mixture and a second amount of said second mixture to the engine in different ratios under different engine load conditions, where said first mixture is delivered to a direct injector of a cylinder and the second mixture is delivered to a port injector of the cylinder, and where at least one of said first and second amounts is adjusted in response to said separation.

14. The method of claim 13 wherein said alcohol includes ethanol.

15. The method of claim 14 wherein said at least one of said first and second amounts is adjusted in response to said operating parameter of the separation.

16. The method of claim 15 wherein said ratio changes as engine load increases.

17. The method of claim 13 wherein said operating condition is at least one of a fuel tank fill level, an engine fueling demand, and an ambient condition of an environment of the vehicle.

18. The method of claim 1 wherein said operating parameter of the separation is at least one of generation rate of one of said first and second mixtures and a concentration of one of said first and second mixtures.

19. A system for a vehicle traveling on the road, the system comprising:
a tank configured to receive a fuel mixture, said mixture having at least some alcohol;
a separator coupled to said tank configured to separate said fuel mixture into at least a first and second mixture on board the vehicle, where said first mixture has a higher alcohol concentration than said second mixture;
a control system configured to vary an operating parameter of the separator in response to a vehicle operating condition; and
a delivery system configured to deliver a first amount of said first mixture and a second amount of said second mixture to the engine in different ratios.

20. The system of claim 19 wherein said delivery system includes a direct cylinder injector for delivering said first mixture and a port injector for delivering said second mixture, said control system further configured to vary said first and second amounts in response to engine load, where said variation of said first and second amounts are adjusted in response to a condition of the separator.

* * * * *